US012634235B2

(12) United States Patent
Paschick

(10) Patent No.: US 12,634,235 B2
(45) Date of Patent: May 19, 2026

(54) METHODS AND SYSTEMS FOR DYNAMIC NETWORK INTERCONNECTIONS

(71) Applicant: Charlotte Wi-Fi Inc., a North Carolina S Corp., Palm Beach Gardens, FL (US)

(72) Inventor: Matthew Lewis Paschick, Palm Beach Gardens, FL (US)

(73) Assignee: Charlotte Wi-Fi Inc., a North Carolina S Corp., Palm Beach Gardens, FL (US)

( * ) Notice: Subject to any disclaimer, the term of this patent is extended or adjusted under 35 U.S.C. 154(b) by 335 days.

(21) Appl. No.: 18/226,063

(22) Filed: Jul. 25, 2023

(65) Prior Publication Data

US 2025/0039090 A1 Jan. 30, 2025

(51) Int. Cl.
H04L 45/80 (2022.01)
H04L 12/66 (2006.01)
H04L 45/50 (2022.01)

(52) U.S. Cl.
CPC .............. H04L 45/80 (2022.05); H04L 12/66 (2013.01); H04L 45/50 (2013.01)

(58) Field of Classification Search
CPC .......... H04L 45/50; H04L 12/66; H04L 45/80
See application file for complete search history.

(56) References Cited

U.S. PATENT DOCUMENTS

| | | | |
|---|---|---|---|
| 2004/0083295 A1* | 4/2004 | Amara ................ | H04L 12/4633 |
| | | | 709/229 |
| 2011/0170554 A1* | 7/2011 | De Smedt ............... | H04L 69/14 |
| | | | 370/401 |
| 2017/0063614 A1* | 3/2017 | Hartwig .............. | H04L 41/0883 |
| 2019/0372888 A1* | 12/2019 | Michael ................ | H04L 45/745 |
| 2024/0187176 A1* | 6/2024 | Wang .................... | H04W 72/23 |

* cited by examiner

*Primary Examiner* — Ajay Cattungal
(74) *Attorney, Agent, or Firm* — POLSINELLI LLP

(57) ABSTRACT

Methods and systems are provided for establishing dynamic connections between network devices and Internet Service Providers. A computing device may receive a registration request associated with a unit of a structure over a first communication channel. The computing device may configure a gateway and/or provider switching device of the structure to connect a service network to a local area network within the unit. The computing device may then receive a request to establish a network connection between the gateway and an Internet Service Provider over a second communication channel. The request may include an identification of a particular Internet Service Provider from a plurality of Internet Service Providers. The computing device may facilitate a connection between the gateway and the particular Internet Service Provider.

17 Claims, 5 Drawing Sheets

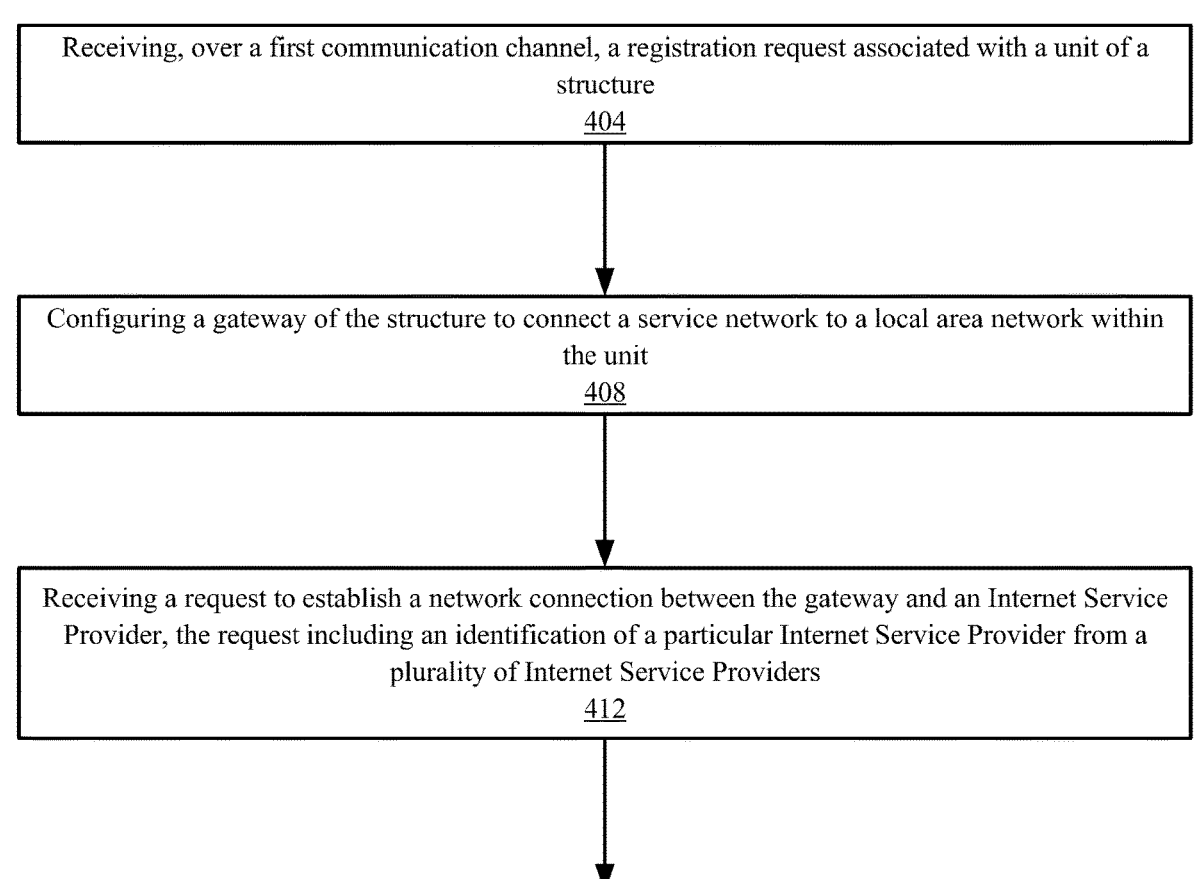

Receiving, over a first communication channel, a registration request associated with a unit of a structure
404

Configuring a gateway of the structure to connect a service network to a local area network within the unit
408

Receiving a request to establish a network connection between the gateway and an Internet Service Provider, the request including an identification of a particular Internet Service Provider from a plurality of Internet Service Providers
412

Facilitating a connection between the gateway and the particular Internet Service Provider
416

FIG. 4

METHODS AND SYSTEMS FOR DYNAMIC NETWORK INTERCONNECTIONS

TECHNICAL FIELD

This disclosure relates to dynamic networking, and more particularly to facilitating connections between end-user networks and Internet Service Providers.

BACKGROUND

A large percentage of housing includes multifamily and multi-tenant housing (e.g., apartments, duplex, condos, etc.). Currently, the building may include a master data closet aka main distribution frame (MDF) or main point of entry (MPOE) in which one or more Internet Service Providers (ISPs) connect to the building. The building cabling may then connect each unit, which may be wired with a physically distinct network, from the MDF using, for example, one or more intermediate data closets aka intermediate distribution frames (IDFs). While the one or more ISPs may be physically connected to the building, the ISPs are not continuously connected to individual units. When a unit selects a particular Internet Service Provider to provide network service, ISP may send a technician to establish a physical connection between the ISP and the specific unit (and disconnect any connections with other ISPs), instantiate a new modem, and configure the modem to communicate with the ISP's network.

Establishing service with an ISP can be a time consuming and error prone process for both the building administrator and the users of the unit. For example, since the technician has to establish a physical connection between the MDF, IDF's and the unit (e.g., on the premise of the building), the technician may affect the networks of other units (e.g., disconnecting the wrong unit, wiring the wrong unit, damaging equipment of the building, etc.), causing significant network disruptions. Further, it can often take days or weeks to establish service with the ISP. The ISP technicians often create appointments with nebulous appointment windows where a technician may show up at any time within a 4 to 8 hour window, which may force tenants to take time off and wait hours for a technician. When network issues arise, the tenant may have to manage both the ISP providing the service and the administrator of the building (that controls the physical infrastructure) to diagnose and correct the problem, thus turning any possible solution into a complex affair.

SUMMARY

Methods are described herein for establishing dynamic connections with remote networks. The methods may comprise receiving, over a first communication channel, a registration request associated with a unit of a structure; configuring a gateway and/or provider switching device of the structure to connect a service network to a local area network within the unit (the local area network or virtual local area network for the specific unit likely already exists); receiving a request to establish a network connection between the gateway and an Internet Service Provider, the request including an identification of a particular Internet Service Provider from a plurality of Internet Service Providers; and facilitating a connection between the gateway and the particular Internet Service Provider.

The systems described herein for establishing dynamic connections with remote networks. The systems may include one or more processors and a non-transitory computer-readable medium storing instructions that, when executed by the one or more processors, cause the one or more processors to perform any of the methods as previously described.

The non-transitory computer-readable media described herein may store instructions which, when executed by one or more processors, cause the one or more processors to perform any of the methods as previously described.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 4 illustrates a flowchart of an example process of dynamically connecting Internet Service Providers to local area networks according to aspects of the present disclosure.

DETAILED DESCRIPTION

Figure 1:
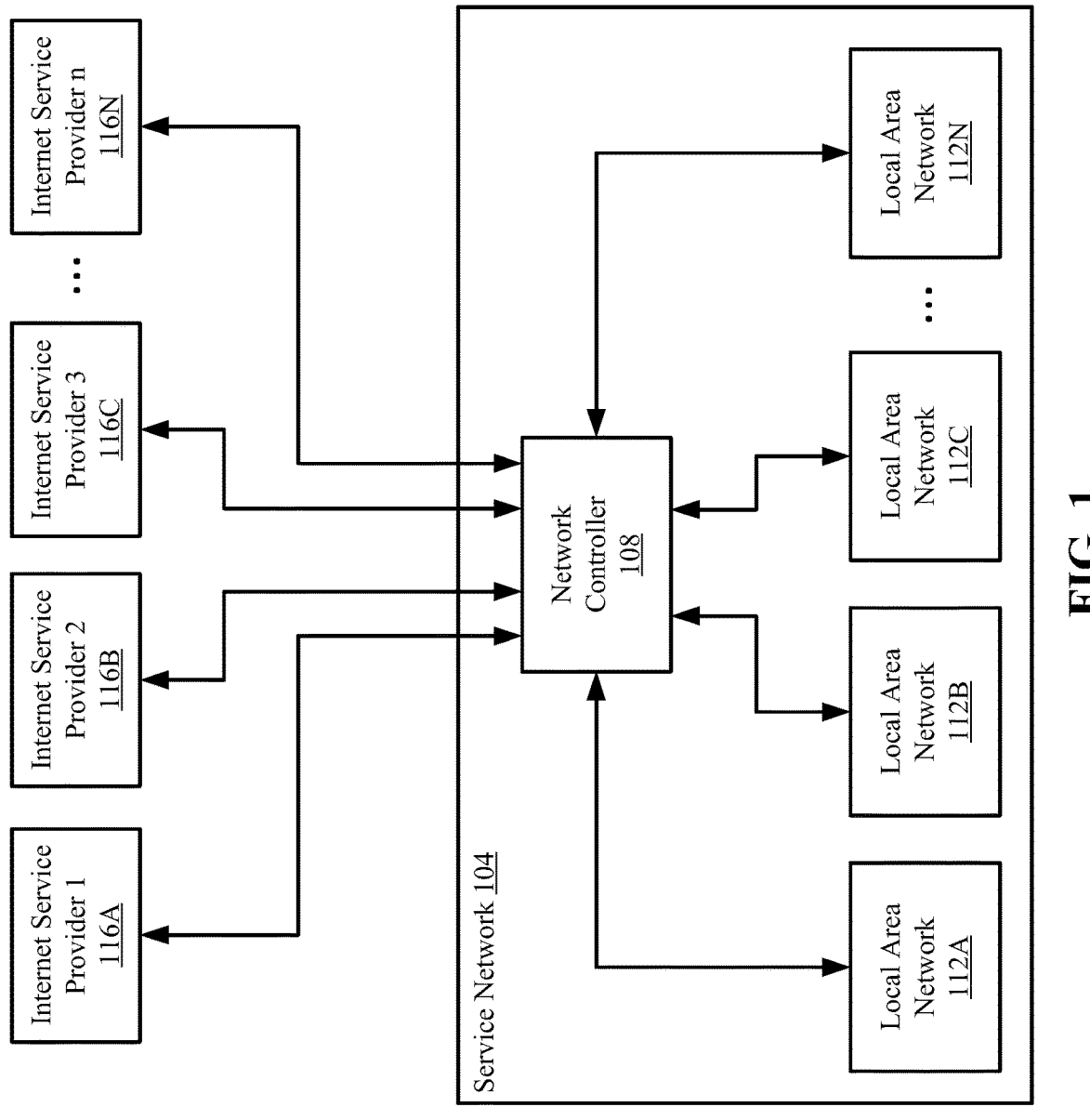
FIG. 1 illustrates a block diagram of an example system for dynamically connecting Internet Service Providers to local area networks according to aspects of the present disclosure.

Network infrastructure within multi-unit structures is often configured to allow each unit to independently interact with and connect the unit to a per-unit selected Internet Service Provider (ISP). A structure may include a main distribution frame (MDF) of the structure that is connected to one or more ISPs. When a unit selects an ISP, the ISP must send a technician to physically connect the unit to the providers network located in the IDF or MDF. The technician of the ISP may also have to provision a modem and authenticate the unit to the network of the ISP. When working on one unit a technician may impact other units by inadvertently disconnecting units, connecting the wrong unit, damaging cabling or equipment, etc. The structure may also need to install duplicate cabling systems, which may increase costs and require future technician visits.

The methods and systems described herein address the aforementioned disadvantages by leveraging the networking infrastructure shared by multiple units of the structure to establish dynamically created individual connections between ISPs and units. One or more ISPs may be connected to external interfaces of a provider switching device (e.g., a network switch and/or processing device configured to provide switching services) located within the structure or external from the structure. The provider switching device may include one or more internal interfaces configured to connect one or more resident gateways which may be connected to the local area networks (e.g., physical or virtual networks) of each unit within the structure. The structure may enable a resident gateway for each unit when the unit is registered (e.g., when a user occupies the unit) or upon receiving a request from the unit to establish a connection with an ISP. The resident gateway may be established using a physical resident gateway device positioned between the provider switching device and the unit's local area network. The physical resident gateway may be located within or proximate to the MDF, IDF, in the unit, etc. or at a remote location. Alternatively, the resident gateway may be a virtual resident gateway that may be generated as one or more processes executing within the provider switching device or a processing device connected to the provider switching device. Multiple virtual resident gateways can be configured over a single physical internal interface of the switch.

The networking infrastructure may include a portal (e.g., an intranet, environment, application, service, etc.) that may be configured to receive a selection of an ISP and configure the provider switching device and/or resident gateways to establish connections with selected ISP. For example, the internal unit portal may cause the network controller to establish virtual local area networks, virtual extensible local area network, virtual private networks, multiprotocol label switching, or the like to establish a layer 2 connection (e.g., data link layer of the open systems interconnection model, or the like) between the resident gateway and the ISP. The internal unit portal may be a component of a network controller positioned within the structure or within a remote network, a cloud network, or the like connected to the network of the structure (e.g., via an ISP, connected data center, etc.). For example, the portal may be a cloud service connected to the networking infrastructure (e.g., through the provider switching device, the Internet, another device, etc.).

A unit may include one or more processing devices (e.g., computing devices, mobile devices, etc. capable of accessing remote networks) that may access the Internet through an ISP. The structure may establish the local area network such that the one or more processing devices can connect to the ISP. In some instances, the unit may operate one or more network devices (e.g., routers, switches, wireless access points, etc.) between the resident gateway and the one or more processing devices.

A user associated with a unit may establish a connection with an ISP using the portal before or after occupying the unit. the user may connect to the portal using access credentials provided by the structure (and/or an administrator thereof). The unit can select an ISP (or two or more ISPs) from a list of ISPs to provide network services to the unit. Upon selecting the ISP, the portal may configure the provider switching device to establish a layer 2 connection between the selected ISP (or ISPs) and the resident gateway of the unit. For example, the internal unit portal may cause the network controller to establish the layer 2 connection (e.g., layer 2 of the Open Systems Interconnection Model) using one or more of: enabling a physical interface connecting the ISP to the resident gateway, adding or modifying virtual local area network and/or virtual extensible local area network tags to the internal or external interface connecting the resident gateway to the switch, establishing a layer 2 virtual private network (or alternatively, establishing a virtual private network using asynchronous transfer mode, frame relay, or the like), establishing multiprotocol label switching, or the like. The initiated layer 2 connection not be fully established until corresponding settings of the selected ISP are configured to match the settings of the resident gateway. Upon the initiation of the layer 2 connection, a notification (via phone, mail, email, text, or other means) may be transmitted to the selected ISP, including information associated with the specific methods utilized to establish the layer 2 connection. The selected ISP may then adjust internal settings of the network of the selected ISP to match the settings of the layer 2 connection to fully establish a layer 2 connection between the selected ISP and the resident gateway.

The selected ISP may establish a connection between the selected ISP and the unit by adjusting their internal settings to match as above and/or issuing an Internet Protocol (IP) address to the unit (e.g., the gateway of the unit, the processing device being utilized to communicate with the selected ISP, etc.) via Dynamic Host Configuration Protocol (DHCP), Point-To-Point over Ethernet (PPPOE) or other protocol. Once the connection is established between the selected ISP and the unit, the unit may communicate directly with the selected ISP to establish service from the selected ISP. For example, the unit may provide identifying information (e.g., personal identifiable information, etc.), payment information, an identification of one or more services of the ISP that are requested (e.g., Internet service, voice over IP, video services, etc.), attribute information associated with the one or more services (e.g., bandwidth, network speed, etc.).

The selected ISP may authenticate the resident gateway (and/or the user of the unit) before establishing service for the unit. In some instances, the selected ISP may authenticate the resident gateway using Remote Authentication Dial-In User Service (Radius). The Radius authentication process may begin with the selected ISP directing the resident gateway to transmit an authentication request to a middleware server. For example, the selected ISP may transmit an address of the middleware server and/or a link that can be executed by the resident gateway, etc. The middleware server may be a device positioned between the selected ISP and external devices such as the resident gateway that may insulate the selected ISP from malicious devices. The middleware server may be a device operated by the selected ISP or operated by another service. In some instances, the middleware server may be the device that the resident gateway is currently communicating with to establish service with the selected ISP.

The resident gateway may transmit an authentication request to the middleware server. The request may include access credentials and/or a security certificate (e.g., provided by the internal unit portal, an administrator of the structure, the selected ISP, combinations thereof, or the like that may be transmitted to the middleware server via a layer 2 (e.g., data link layer) protocol such as hypertext transfer protocol secure web form, point-to-point protocol, or the like. The request may also include information associated with the user (e.g., such as, but not limited to, identifying information, device information, network information such as an IP address, etc.), information associated with physical layer (e.g., layer 1) connection between the resident gateway and the middleware server. The middleware server may retransmit the information to a Radius authentication server to authenticate the resident gateway. In some instances, if the information included in the request is insufficient, then the Radius authentication server may transmit an access challenge to the middleware server, which may retransmit the access challenge to the resident gateway. The access challenge may include a request for additional information from the resident gateway before determining whether to authenticate or deny the resident gateway. The additional information may include, but is not limited to, access credentials, cryptographic keys, tokens, personal identifiable information, device information, etc.

In other instances, the selected ISP may authenticate the resident gateway using PPPOE. PPPOE encapsulates point-to-point protocol (PPP) frames within ethernet frames. PPPOE may include two phases: an active discovery phase (e.g., where the resident gateway may establish a connection with a PPPOE server and a session can be initiated) and a PPP session phase (e.g., where the resident gateway may authenticate). PPPOE may operate as a layer 2 encapsulation (e.g., data can be transferred over a PPP link within PPPOE frame headers). Once a session is established between the resident gateway and the PPPOE server, the resident gateway can be authenticated using a password authentication protocol (PAD) with a username and/or password, cryptographic key, token, personal identifiable information, combinations thereof, or the like. Other such authentication processes may be performed in addition to or in place of the aforementioned authentication methods. Examples of other authentication protocols include, but are not limited to, multi-factor authentication, challenge handshake authentication protocol, extensible authentication protocol, combinations of any of the aforementioned authentication process, or the like.

Once the resident gateway is authenticated by the selected ISP, the selected ISP may begin providing services (e.g., Internet access, voice over IP, etc.) to the unit. Access to the selected ISP (and the Internet) may be provided through the provider switching device and resident gateway managed by the structure allowing the structure to maintain operational control over the internal network and wiring of the structure while providing units with increased flexibility in choosing ISPs and establishing connections with ISPs and other remote networks. For example, units can establish a connection with any ISP that may be locally or remotely connected to the structure (e.g., such large ISPs, community ISPs, etc.). In addition, units can establish connections with multiple ISPs at the same time (e.g., for increased bandwidth, isolating network operations, etc.) over the same physical connection between the unit and the switch. For instance, a unit occupied by two different businesses can establish two different ISP connections (e.g., with the same ISP or different ISPs) using the same physical wiring of the unit. Connections with the ISPs can be established virtually without scheduling a technician to physically establish the connection.

In an illustrative example, a request may be received at a computing device to establish a connection between a resident gateway and an ISP. The request may be received through a user interface (e.g., graphical user interface, input/output interface, etc.) of the computing device. The request may be received from an end-user computing device such as a computer, mobile device (e.g., such as a smartphone, tablet, etc.), server, or the like that is requesting service from an ISP (e.g., access to the Internet, telephony such as voice over IP, etc.) associated with the local area network. The computing device may be a component of a network of a structure (e.g., a building, etc.) capable of configuring dynamic connections between end-user computing devices positioned within or connected to the structure and one or more ISPs. The computing device may be local to the service network (e.g., positioned within structure and connected to the service network, etc.) or remote from the service network (e.g., a component of a remote network configured to remotely configure the service network) The local area network may be one of many local area networks established by the structure that may each independently obtain services from an ISP.

The structure may maintain a network that includes the computing device, one or more network devices (e.g., switches, gateways, routers, etc.), and/or other devices (e.g., computing devices, mobile devices, etc.). In some examples, the network may include a provider switching device that includes one or more external interfaces configured to maintain a physical connection with the one or more ISPs and one or more internal interfaces configured to configured to maintain connections with the one or more resident gateways (and thereby local area networks or virtual local area networks) of the structure. The physical infrastructure of the local area networks (e.g., via ethernet cables, network devices such as gateways or routers, wireless access points, and/or the like) may be established during construction of the unit or structure. Some physical infrastructure of the local area networks may be established during registration of the unit or after a user associated with the unit occupies the unit by, for example, powering on or enabling devices, adding additional devices, assigning IP addresses, etc. The computing device may be configured to configure the provider switching device to initiate a layer 2 connection between a resident gateway of the local area network and the selected ISP. The end-user computing device may transmit the request to establish a connection between an end-user computing device and an ISP through the one or more graphical user interfaces.

For example, the computing device may establish a portal through which an end-user processing device can communicate with the computing device. The graphical user interface may be presented via a webpage, web service, application, process, combinations thereof, or the like. The graphical user interface may be accessible to devices connected to the internal interfaces of the provider switching device or accessible via the Internet. For example, the portal may be included in a cloud service accessible from anywhere enabling the end-user processing device to establish a connection between the resident gateway of the unit and a selected ISP before occupying the unit. End-user processing devices may access the graphical user interface of the computing device using a web browser, an application, process, or the like. In some instances, the end-user computing device may navigate to the interface (e.g., using a link or address). In other instances, the computing device may be configured to redirect the end-user computing device to the interface.

The end-user computing device may transmit the request through the graphical user interface (e.g., via a web form, text-based communication, data communication, etc.). For example, the interface may include an identification of a multiple possible ISPs (e.g., those ISPs that have established a physical connection with the provider switching device) as well as configuration information associated with each ISP (e.g., offered plans, pricing, available bandwidth, etc.). The end-user computing device may select a particular ISP and optionally a configuration causing the interface to cause the computing device to configure the provider switching device.

The computing device may configure the provider switching device based on the selected ISP to establish a connection between the gateway of the unit's local area network and the selected ISP. For example, the computing device may initiate the connection by enabling one or more physical interfaces of the switch, establishing or modifying an existing virtual local area network, and/or virtual extensible local area network, a layer 2 virtual private network, multiprotocol label switching (MPLS), combinations thereof, or the like. In some instances, the connection may be a layer 2 connection (e.g., data link layer, or the like), etc. In some instances, the particular ISP may authenticate the resident gateway of the local area network using Radius or PPPOE. Once authenticated, the particular ISP may issue the resident gateway a new IP address via DHCP, PPPOE, etc.

In some instances, the network of the structure may be configured to facilitate multiple connections between one or more ISPs and the unit local area network enabling the resident gateway to segment network traffic according to a particular context. For example, a resident gateway may connect multiple computing devices to the network device of the structure with some of the computing devices being used for an office and other computing devices being used for other purposes. Multiple ISP connections can be established to enable network traffic of the computing devices for the office to be transmitted through one ISP and network traffic of the computing devices for other purposes to be transmitted through another ISP (or an independent connection with the same ISP).

FIG. 1 illustrates a block diagram of example system for dynamically connecting Internet Service Providers to local area networks according to aspects of the present disclosure. Service network 104 may be a network established to support one or more local area networks. In some examples, service network 104 may be positioned within one or more structures that comprise a set of physical units (e.g., substructures of the one or more structures) that may be occupied by a user. Service network 104 may include network controller 108, which may be one or more devices configured to route communications to local area networks (e.g., such as local area networks 112A-112N), to one or more ISPs (e.g., such as Internet Service Providers 116A-116N), and/or one or more remote networks. Network controller 108 may include one or more devices that provide the functionality of switches, gateways, routers, and/or other network devices configured to route communications to physically connected devices (e.g., such as, but not limited to, via ethernet, or the like), virtual devices (e.g., such as, but not limited to, virtual gateways, virtual local area network, virtual extensible local area network, etc.), wireless connected devices (e.g., such as, but not limited to Wi-Fi, Bluetooth, Zigbee, Z-wave, or any other wireless communication protocol), combinations thereof, or the like.

Service network 104 may include one or more local area networks (e.g., local area networks 112A-112N) associated with a unit (or substructure) of the structure managed by service network 104 For example, a new user may rent an apartment within an apartment complex managed by service network 104. The unit may include network infrastructure that establishes the local area network (e.g., ethernet cabling, network devices, etc.). Alternatively, the local area network may be established during a new unit registration (e.g., when the new user rents the apartment) or after a user associated with the unit occupies the unit (e.g., after the new user moves into the apartment). Network controller 108 may receive a communication from the internal portal selecting ISP 116A of ISPs 116A-116N to provide services to local area network 112A. Network controller 108 may configure the provider switching device of network controller 108 and/or the network gateway associated with local area network 112A to enable a connection with ISP 116A. In some examples, network controller 108 may be a single device that may provide any of the aforementioned features.

Network controller 108 may then initiate a layer 2 connection between ISP 116A and local area network 112A (e.g., the resident gateway thereof) allowing local area network 112A to establish service with ISP 116A. The layer 2 connection may not be fully established until the ISP 116A configures settings of its network to match the settings of the resident gateway. For instance, network controller 108 may transmit a communication to ISP 116A with an identification of the configuration of the resident gateway (e.g., VLAN tags, VXLAN tags, etc.) enabling ISP 116A to detect the resident gateway and fully establish the layer 2 connection.

Figure 2:
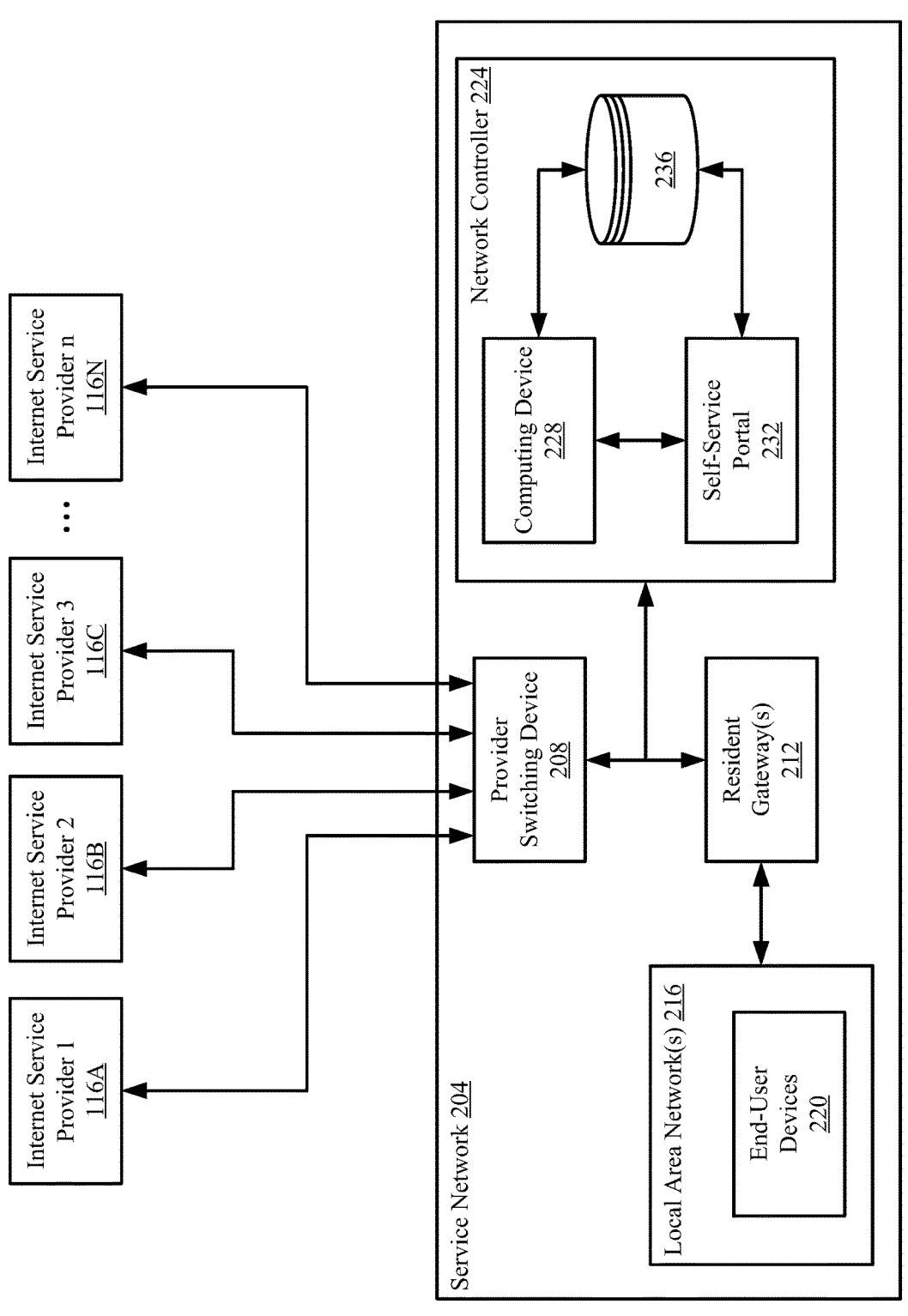
FIG. 2 illustrates a block diagram of an example system for dynamically establishing connections between resident gateways and Internet Service Providers according to aspects of the present disclosure.

FIG. 2 illustrates a block diagram of example system for dynamically establishing connections between resident gateways and Internet Service Providers according to aspects of the present disclosure. Service network 204 may be an alternative version of service network 104 in which network controller 108 may include a set of devices configured to manage service network 204 and provide dynamic communication services to local area networks 216 (e.g., such as, but not limited to provider switching device 208, resident gateway(s) 212, network controller 224, etc.). For instance, service network 204 may include provider switching device 208. Provider switching device 208 (e.g., a provider switching device, etc.) may include one or more external interfaces configured to maintain a physical connection with one or more ISPs 116A-116N and one or more internal interfaces configured to maintain connections with one or more local area networks 216. In some examples, each internal port may be connected to one or more local area networks (e.g., using a physical connection, VLAN, VXLAN, MPLS, VPN, combinations thereof, or the like.

Resident gateway(s) 212 may include physical devices and/or software process configured to connect networks. Service network 204 may include a resident gateway 212 for each unit. Resident gateway(s) 212 may be positioned in the MDF and/or an IDF of the structure or a remote location such as a data center. For example, the resident gateway(s) 212 may be positioned proximate to provider switching device 208. Resident gateway(s) 212 may also be positioned within a central location or distributed across the structure. The services of provider switching device 208 and resident gateway(s) 212 may be performed by independent devices (as shown) or by a single device. The services of provider switching device 208 may be performed by a single or multiple devices located within the structure, at remote locations, or both.

Network controller 224 may be connected to provider switching device 208 and/or resident gateway(s) 212. Network controller 224 may manage service network 204 and establish dynamic connections between ISPs 116 and local area networks 216. Network controller 224 may be positioned within the structure (e.g., operating within service network 204 as shown) or may be positioned remotely from the structure and connected to service network 204 through provider switching device 208. Network controller 224 may include computing device 228 (and/or one or more other computing devices, servers, mobile devices, etc.), which may communicate with ISPs 116A-116N, communicate with local area networks 216 (and any devices therein), provision provider switching device 208 and/or resident gateway(s) 212 (e.g., firmware updates or custom firmware, operating system or other software, and/or the like), configure provider switching device 208 and/or resident gateway(s) 212, combinations thereof, or the like.

Network controller 224 may communicate with end-user devices 220 via local area networks 216 to enable configuring dynamic connections between ISPs 116A-116N and local area networks 216. For example, network controller 224 may include self-service portal 232, which may be an environment within network controller 224 through which end-user devices 220 can establish a connection to a particular ISP, change from one ISP to another ISP, establish multiple connections with one or more ISPs, or the like. Self-service portal 232 may be an intranet, local or remote web service, application, process, or the like that may expose graphical user interfaces (and/or other interfaces such as, but not limited to, application programming interface, network interfaces, input/output interfaces, etc.).

In some examples, self-service portal 232 may be a webservice, webpage, or other web-based interface that can be accessed through a browser of end-user device 220. Self-service portal 232 may request access credentials (e.g., provided to end-user device 220 or the user thereof when the end-user device and/or the user thereof registered with service network 204 or occupied a substructure of the structure serviced by service network 204) to authenticate end-user device 220 and/or the user thereof. The received access credentials may be compared to corresponding access credentials stored in database 236 (or in other memory). Once authenticated, the graphical user interface of self-service portal may be presented by end-user device 220 enabling a selection of one or more ISPs.

Self-service portal may pass an identification of the selected ISP, the end-user device and/or the user thereof, the local area network corresponding to the end-user device, etc. to computing device 228 and or database 236. Computing device 228 may then provision and/or configure provider switching device 208 and/or the resident gateway 212 associated with the end-user device to enable a connection with the selected ISPs. For example, computing device may establish the connection between the selected ISP and the resident gateway 212 associated with the end-user device by enabling or establishing a physical interface between the ISPs and resident gateway 212, establishing a virtual local area network, establishing a virtual extensible local area network, establishing a layer 2 virtual private network, establishing multiprotocol label switching, combinations thereof, or the like. In some instances, the established connection may be a layer 2 connection. In other instances, the layer 2 connection may not be fully established until the provider changes their settings to match the configuration of the resident gateway.

In some examples, network controller 224 may monitor network traffic passing over service network 204 (e.g., between local area networks 216 and ISPs 116A-116N) to maintain the integrity of service network 204. For example, network controller 224 may use one or more processes (e.g., such as machine-learning models, or other process) configured to detect malicious network traffic or devices that may access unauthorized information, personal identifiable information, infiltrate local area networks, or the like. Network controller 224 may also monitor the health of service network 204 may monitoring bandwidth, congestion, network speed, etc. to identify when additional network resources may be needed or when components may need to be reconfigured or replaced. For instance, network controller 224 may use historical network characteristics to detect network congestion or failing components.

Figure 3:
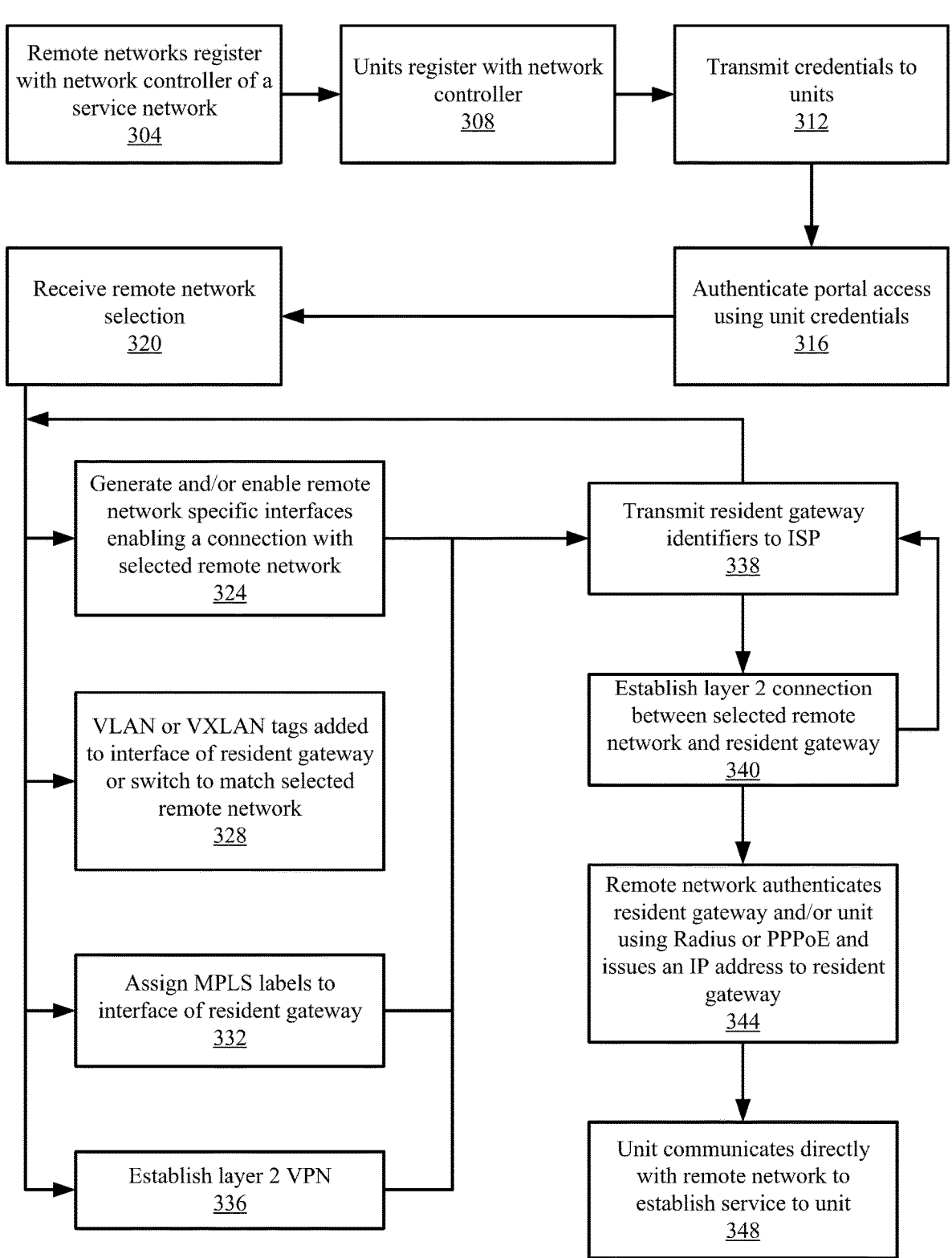
FIG. 3 illustrates a flowchart of an example process of dynamically establishing connections between resident gateways and Internet Service Providers according to aspects of the present disclosure.

FIG. 3 illustrates a flowchart of an example process of dynamically establishing connections between resident gateways and Internet Service Providers according to aspects of the present disclosure. A service network may be established to dynamically manage connections between remote networks (e.g., such as, but not limited to, ISPs, cloud networks, wide area networks, etc.). The service network may include one or more switches, gateways, routers, and/or other network devices configured to route communications to physically connected devices (e.g., such as, but not limited to, via ethernet, or the like), virtually connected devices (e.g., such as, but not limited to, a virtual local area network, virtual extensible local area network, etc.), wireless connected devices (e.g., such as, but not limited to Wi-Fi, Bluetooth, Zigbee, Z-wave, or any other wireless communication protocol), combinations thereof, or the like.

At block 304, a network controller of the service network may enable remote networks to connect to and/or register with the service network. The remote network first establishes a physical network interface with the provider switching device. Within the physical network interface one or more virtual, virtually extensible, VPN, and/or MPLS interfaces may also be established. The remote networks may also transmit a request to register the remote network. The request may include one or more of an identification of the remote network (e.g., an identifier, IP address, VLAN or VXLAN tags, MAC address, MPLS identifiers, VPN encryption information, other address, etc.), an identification of services provided by the remote network, attributes of the services provided (e.g., quantity of bandwidth for Internet connectivity, etc.), a time interval over which the registration is to be effective, contact information of the remote network, combinations thereof, or the like. In some examples, upon registering with the network controller, the remote network may transmit an authentication package usable to authenticate local area networks of the service network. The authentication package may include one or more cryptographic keys, tokens, security certificates, or the like. For example, a remote network may generate pairs of matching tokens and transmit one token of each pair to the network controller in an authentication package. When a local area network attempts to access the remote network through the service network, the local area network may transmit a token (provided by the service network to the local area network), which can be matched to the corresponding token stored by the remote network to authenticate the local area network.

The network controller may store the registration of each remote network in a database accessible to the network controller. For example, the database may be located within local memory of the network controller, memory physically connected to the network controller, remote memory accessible to the network controller (e.g., through the service network and/or other networks).

At block 308, the network controller may register a new unit. A unit may correspond to a physical or virtual location within an environment (e.g., such a building, complex, facility, etc.). The local area network of the unit may be established using network infrastructure (e.g., ethernet cables, network devices, etc.) positioned within or proximate it to the unit. The network controller may provision or instantiate a resident gateway to establish or manage a connection between a local area network of the unit and the service network. The resident gateway may be a physical device or software process (e.g., virtual gateway, or the like) In some instances, the service network may assign a resident gateway for each local area network to be established. In other instances, the service network may assign a resident gateway for one or more local area networks. The resident gateways of the service network may be positioned in a central location (e.g., such as near an MDF, IDF, remote data center, or the like).

New units may be registered when a new user acquires the unit. A new user may acquire the unit by renting, purchasing, and/or occupying the unit. The service network may store details associated with the new user such as, but not limited to, an identification of the user, an identification of one or more devices associated with the user (e.g., such as device identifiers, MAC address, device characteristics such as hardware and/or software installed thereon, etc.), an identification of one or more other users to be associated with the unit, an identifier of the new unit, combinations thereof, or the like. Alternatively, a unit may correspond to a local area network configured to access one or more remote networks through the service network.

The service network may establish or manage a local area network for each unit of the environment. In some examples, the network infrastructure of each unit may be isolated from other units such that any network wiring (e.g., ethernet, or the like) of one unit may not be connected to other units. In other examples, two or more units may include shared network wiring. In those examples, the service network may use VLAN, VXLAN, or similar techniques to isolate the networks or devices of each unit connected to the service network.

At block 312 and upon registering the unit, access credentials may be transmitted to the resident gateway, a processing device connected to the resident gateway, to a processing device associated with the new user, and/or to the new user (e.g., using physical mail, email, text messaging, and/or any other communication channel). The access credentials may include a username, password, cryptographic key (e.g., such as a public key, private key, and/or the like), a token (e.g., such as a single or multiuse token to authenticate the new user, the resident gateway, and/or any other device of the unit), security certificate, and/or the like. The access credentials may be usable to authenticate new devices connected to the resident gateway and associate the devices with a particular user. Corresponding access credentials may be stored with the registration of the unit in the database of the network controller such that the corresponding access credentials are associated with the particular unit for which the access credentials are generated.

At block 316, the new user may request access to the service network using a processing device. One or more services of the service network may be accessible to processing devices of the new user (e.g., before or after gaining physical access to the unit). For example, the one or more services may include a portal operated by a cloud service that may be accessible to the processing device remotely from the service network. The request may include the access credentials received at block 312 to enable the service network to authenticate the processing device. The network controller may receive the request and access credentials and match the access credentials to a record in the database of the network controller. In some instances, the network controller may identify the particular unit that transmitted the request based on the resident gateway that provided the request to the network controller. When the network controller receives the request from the resident gateway, the network controller may identify the corresponding access credentials that correspond to the unit that transmitted the request. If the access credentials in the request match the corresponding access credentials associated with the unit stored in the database of the network controller, then the network controller may determine that the resident gateway is authenticated. If the network controller cannot identify the particular unit that transmitted the request, then the network controller may search the database to identify a matching corresponding access credentials. If the network controller identifies a matching corresponding access credentials, then the network controller may determine that the processing device is authenticated. If the processing device cannot be authenticated, then the service network may isolate the resident gateway (e.g., disable the physical port, block network traffic, etc.) to prevent access to the service network.

At block 320, the unit may select a remote network to provide services to the resident gateway. The portal may include a graphical user interface to enable the processing device to present an identification of the one or more remote networks that are configured to provide services to units. The processing device may select a particular remote network of the one or more remote networks and transmit the selection to the network controller. In some instances, the graphical user interface may be a webpage, webservice, application, process, or the like. The graphical user interface may include dropdown menus, radio buttons, etc. usable to make a remote network selection. Upon making a selection, the graphical user interface may generate a uniform resource locator (URL) or other mechanism that includes an identifier of the selected remote network included therein. When the processing device navigates to the URL, the network controller may identify the selected remote network from the URL. Alternatively, the graphical user interface may transmit a communication to a management process of the network controller that includes an identification of the selected remote network.

At 324, the network controller may configure the provider switching device of the service network and/or the resident gateway to enable a connection between the resident gateway (e.g., the local area network) and the remote network. The network controller may enable the connection between the resident gateway and the remote network by enabling a physical interface between resident gateway and the remote network. For example, the network controller may configure the provider switching device to enable a physical interface such as an ethernet port connected to the remote network and/or the resident gateway. Alternatively, an administrator of the service network may enable a physical interface establishing a connection between the provider switching device and the resident gateway and/or a connection between the remote network and the provider switching device.

Alternatively, (e.g., in place of block 324), the process may instead continue at block 328, where the network controller may configure the provider switching device or unit resident gateway to add or modify VLAN or VXLAN tags that match the selected remote network. The tags may enable a layer 2 connection (e.g., data link layer, or the like) to be established between the remote network and the resident gateway. Multiple VLANs and VXLANs can operate over a physical interface of the provider switching device allowing a single physical interface to include network traffic of two or more local area networks.

Alternatively, (e.g., in place of blocks 324 and 328), the process may instead continue at block 332, where the network controller may establish multiprotocol label switching to create a connection between the resident gateway and the remote network. MPLS assigns labels to data packets that correspond to a particular local area network. The packets may be routed according to the assigned label rather than the contents of the packet. MPLS can encapsulate communications of various network protocols (e.g., IP packets, asynchronous transfer mode, frame relay, ethernet, etc.). MPLS can operate over a physical interface of the provider switching device allowing a single physical interface to include network traffic of two or more local area networks.

Alternatively, (e.g., in place of blocks 324, 328, and 332), the process may instead continue at block 336, where the network controller may establish a layer 2 virtual private network that operate to create a connection between the resident gateway and the remote network. Layer 2 VPNs may be based on a border gateway protocol or a label distribution protocol. Layer 2 VPNs can operate over a physical interface of the provider switching device allowing a single physical interface to include network traffic of two or more local area networks.

At block 338, the network controller may transmit a communication including one or more identifiers associated with the configuration of the resident gateway or provider switching device to the selected remote network enabling the remote network to detect the resident gateway. The communication may be transmitted over a separate communication channel (e.g., a communication channel that may not include the resident gateway). For example, if the resident gateway is configured with virtual local area network tags, the network controller may transmit an identification of the virtual local area network tags of the resident gateway to enable the selected remote network the ability to detect the existence of the resident gateway. The selected remote network may then alter settings of the selected remote network to fully establish the layer 2 connection. Block 338 may execute when configuring the provider switching device or resident gateway may not be detectable by the selected remote network. In some instances, the selected remote network may transmit a response to the network controller with an indication as to whether the resident gateway could be detected using the one or more identifiers. If the selected remote network cannot detect the resident gateway, the network controller may reconfigure the resident gateway (e.g., returning to block 324, 328, 332, or block 336).

At block 340, the layer 2 connection is established between the remote network and the resident gateway. If the layer 2 connection is not established (e.g., based on receiving a timeout event, user input, a communication from the selected remote network, etc.), then the process may return to block 338, where the network controller may communicate with the selected remote network enable the select remote network to identify the resident gateway.

At block 344, the remote network may authenticate the resident gateway and/or the unit using the authentication package (if present), Radius, PPPOE, or the like. For example, the Radius authentication process may begin with the selected remote network directing the resident gateway to transmit an authentication request to a middleware server. For example, the selected remote network may transmit an address of the middleware server and/or a link that can be executed by the resident gateway, etc. Alternatively, the selected remote network may provide an address of the middleware server to the service network during registrations at block 304. The middleware server may be a device positioned between the selected remote network and external devices such as the service network that may insulate the selected remote network from malicious devices. The middleware server may be a device operated by the selected remote network or operated by another service such as an authentication service.

The resident gateway may transmit an authentication request to the middleware server. The request may include access credentials and/or a security certificate (e.g., provided by authentication package, the network controller, an administrator of the service network, the selected remote network, combinations thereof, or the like) that may be transmitted to the middleware server via the layer 2 connection such as hypertext transfer protocol secure web form, point-to-point protocol, or the like. In some instances, the request may also include information associated with the user (e.g., such as, but not limited to, identifying information, device information, network information such as an IP address, etc.), information associated with physical layer (e.g., layer 1) connection between the resident gateway and the middleware server, combinations thereof, or the like. The middleware server may retransmit the information to a Radius authentication server to authenticate the resident gateway. In some instances, if the information included in the request is insufficient, then the Radius authentication server may transmit an access challenge to the middleware server, which may retransmit the access challenge to the resident gateway. The access challenge may include a request for additional information from the resident gateway before determining whether to authenticate or deny the resident gateway. The additional information may include, but is not limited to, access credentials, cryptographic keys, tokens, personal identifiable information, device information, etc.

In some examples, PPPOE may be used to authenticate the resident gateway. PPPOE encapsulates PPP frames within ethernet frames. PPPOE may include two phases: an active discovery phase (e.g., where the resident gateway may establish a connection with a PPPOE server and a session can be initiated) and a PPP session phase (e.g., where the resident gateway may be authenticated). PPPOE may operate as a layer 2 encapsulation (e.g., data can be transferred over a PPP link within PPPOE frame headers). Once a session is established between the resident gateway and the PPPOE server, the resident gateway can be authenticated using a password authentication protocol (PAD) with a username and/or password, cryptographic key, token, personal identifiable information, combinations thereof, or the like (e.g., as provided by the authentication package, administrator of the service network, the selected remote network, etc.).

In some instances, block 344 may be executed before 340. For example, the selected remote network may authenticate the resident gateway before establishing the layer 2 connection with the resident gateway. Once authenticated, the selected remote network may establish the layer 2 connection with the resident network.

At block 348, the remote network may issue a new IP address to the resident gateway allowing the resident gateway to communicate over the remote network with other networks (e.g., such as the Internet, or the like). The IP address may be issued via DHCP, PPPOE, or the like. In Some instances, block 348 may be combined with block 344 or 340. That is, when the PPPOE connection is established for authentication, the remote network may issue an IP address to the resident gateway. Alternatively, the IP address may be issued via DHCP when the layer to connection is established at block 340.

Once the IP address is issued, the resident gateway may establish service with the selected remote network. For instance, the resident gateway may establish services (e.g., Internet access, voice over IP telephony, and/or other services of the selected remote network), attributes of the services requested (e.g., bandwidth, network speed, etc.), payment for requested services, etc. Once the services are determined, the selected remote network may begin providing services to the resident gateway (e.g., and the devices connected to the local area network established by the resident gateway) via the service network.

FIG. 4 illustrates a flowchart of an example process of dynamically connecting Internet Service Providers to local area networks according to aspects of the present disclosure. At block 404, a computing device may receive a registration requested associated with a unit of a structure over a first communication channel. The structure may include one or more units (e.g., a substructure within the structure) that may be occupied by one or more users. A user may register unit upon acquiring the unit from an administrator of the structure. During the registration, the administrator and/or the computing device may provide access credentials to the user enabling access by the user to a portal associated with the service network of the structure and/or to the service network.

At block 408, the computing device may configure a gateway of the structure. The gateway may be a physical gateway or a virtual gateway (e.g., a software process, etc.) that is operated by the service network of the structure. The structure may instantiate or provision a gateway for each unit prior to or when a new user registers the unit with the structure. The gateway may connect a service network to the local area network within the unit. The gateway may be positioned with or executed by other network devices of the structure such devices located within an MDF, IDF, remote data center or the like.

At block 412, a computing device may receive a request to establish a network connection between the gateway and an Internet Service Provider. The request may include an identification of a particular Internet Service Provider from a plurality of Internet Service Providers. The request may be received over a second communication channel between the network controller and the computing device. For example, an end-user computing device connected to the local area network (e.g., via the gateway or another network device) may transmit the request via the gateway and the service network to the computing device. This communication may also occur via communication independent of the local area network. The end-user computing device may be a network device (e.g., such as switch, gateway, router, etc.), computer, mobile device (e.g., such as a smartphone, tablet, etc.), server, or the like.

The computing device may include one or more graphical user interfaces that can be accessed by the end-user computing device through the gateway. The graphical user interface may be generated by a webpage, webservice, application, process, or the like. The end-user computing device may transmit the request to establish a connection between an end-user computing device and an ISP through the one or more graphical user interfaces. For example, the computing device may host a portal that provides access to the graphical user interface to device connected to the service network. The end-user computing device may access the portal to display the graphical user interface and interact with the graphical user interface to select an ISP. The graphical user interface may include an identification of one or more ISPs configured to provide services to the end-user computing device, an identification of services provided by the ISPs, attributes of the services provided by the ISPs (e.g., offered plans, pricing, available bandwidth, etc.), combinations thereof, or the like.

At block 416, the computing device may then facilitate a connection between the gateway and the particular Internet Service Provider. In some examples, the computing device facilitates the connection by configuring the gateway and/or the provider switching device using virtual local area network tags or virtual extensible local area network tags that match the particular Internet Service Provider. In some examples, the computing device facilitates the connection by, establishing a layer 2 virtual private network configured to establish a layer 2 connection between the particular Internet Service Provider and the gateway via a switch. In some examples, the computing device facilitates the connection by enabling a physical interface between the gateway and the Internet Service Provider. In some examples, the computing device facilitate the connection by establishing a multiprotocol label switching configured to route data packets between the particular Internet Service Provider and the gateway. The connection may be a layer 2 connection (e.g., data link layer, or the like), etc.

In some examples, the established connection between the gateway and the particular Internet Service Provider may not be a full connection (e.g., limiting the transmission of data, types of data, etc.) until the particular Internet Service Provider configures settings of the particular Internet Service Provider. In those examples, the computing device may transmit configuration information associated with the gateway (e.g., VLAN tags, VXLAN tags, identifiers, credentials, etc.) to the particular Internet Service Provider enabling the particular Internet Service Provider to identify the gateway and establish a full (e.g., unrestricted) connection between the gateway and the particular Internet Service Provider.

The particular ISP may determine to authenticate the gateway before providing services to the gateway and its local area network. For example, the particular ISP may authenticate the gateway using Radius, PPPOE, or the like. In other instances, the service network may authenticate the gateway (as previously described) and communicate with the particular ISP to notify the particular ISP of the authentication. Once authenticated, the particular ISP may issue the end-user computing device a new IP address via DHCP, PPPOE, etc.

In some instances, the service network of the structure may be configured to facilitate multiple connections between the particular ISP (or with multiple different ISPs) and the gateway enabling the end-user computing device to segment network traffic according to a particular context. For example, a resident gateway may connect multiple computing devices to the network device of the structure with some of the computing devices being used for an office and other computing devices being used for other purposes. Multiple ISP connections can be established to enable network traffic of the computing devices for the office to be transmitted through one ISP and network traffic of the computing devices for other purposes to be transmitted through another ISP (or through a different connection with the same ISP).

Figure 5:
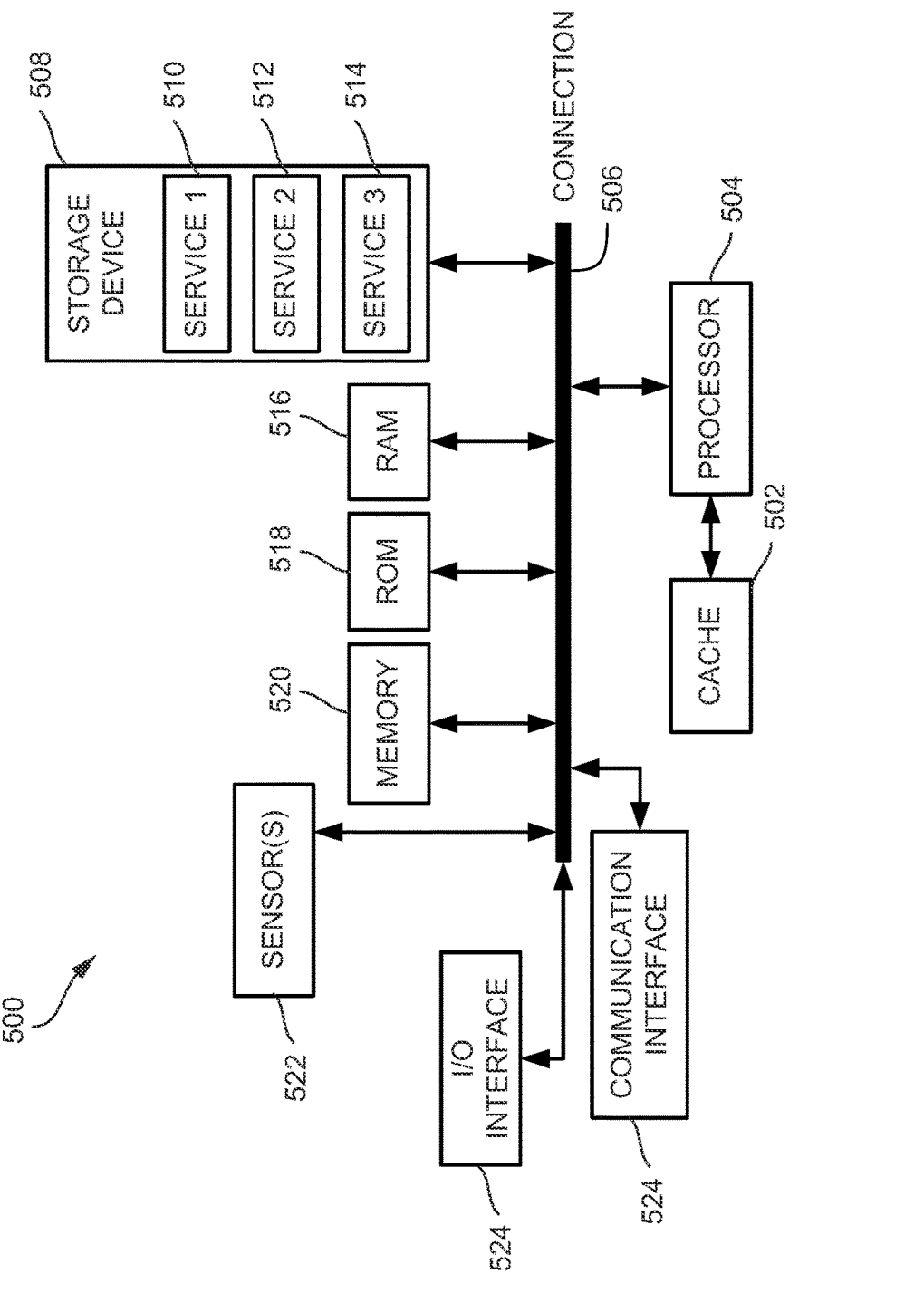
FIG. 5 illustrates an example computing device architecture of an example computing device that can implement the various techniques described herein according to aspects of the present disclosure.

FIG. 5 illustrates an example computing device according to aspects of the present disclosure. For example, computing device 500 can implement any of the systems or methods described herein. In some instances, computing device 500 may be a component of or included within a media device. The components of computing device 500 are shown in electrical communication with each other using connection 506, such as a bus. The example computing device 500 includes a processor (e.g., CPU, processor, or the like) 504 and connection 506 (e.g., such as a bus, or the like) that is configured to couple components of computing device 500 such as, but not limited to, memory 520, read only memory (ROM) 518, random access memory (RAM) 516, and/or storage device 508, to processing unit 510.

Computing device 500 can include a cache 502 of high-speed memory connected directly with, in close proximity to, or integrated within processor 504. Computing device 500 can copy data from memory 520 and/or storage device 508 to cache 502 for quicker access by processor 504. In this way, cache 502 may provide a performance boost that avoids delays while processor 504 waits for data. Alternatively, processor 504 may access data directly from memory 520, ROM 517, RAM 516, and/or storage device 508. Memory 520 can include multiple types of homogenous or heterogeneous memory (e.g., such as, but not limited to, magnetic, optical, solid-state, etc.).

Storage device 508 may include one or more non-transitory computer-readable media such as volatile and/or non-volatile memories. A non-transitory computer-readable medium can store instructions and/or data accessible by computing device 500. Non-transitory computer-readable media can include, but is not limited to magnetic cassettes, hard-disk drives (HDD), flash memory, solid state memory devices, digital versatile disks, cartridges, compact discs, random access memories (RAMs) 525, read only memory (ROM) 520, combinations thereof, or the like.

Storage device 508, may store one or more services, such as service 1 510, service 2 512, and service 3 514, that are executable by processor 504 and/or other electronic hardware. The one or more services include instructions executable by processor 504 to: perform operations such as any of the techniques, steps, processes, blocks, and/or operations described herein; control the operations of a device in communication with computing device 500; control the operations of processing unit 510 and/or any special-purpose processors; combinations therefor; or the like. Processor 504 may be a system on a chip (SOC) that includes one or more cores or processors, a bus, memories, clock, memory controller, cache, other processor components, and/or the like. A multi-core processor may be symmetric or asymmetric.

Computing device 500 may include one or more input devices 522 that may represent any number of input mechanisms, such as a microphone, a touch-sensitive screen for graphical input, keyboard, mouse, motion input, speech, media devices, sensors, combinations thereof, or the like. Computing device 500 may include one or more output devices 524 that output data to a user. Such output devices 524 may include, but are not limited to, a media device, projector, television, speakers, combinations thereof, or the like. In some instances, multimodal computing devices can enable a user to provide multiple types of input to communicate with computing device 500. Communications interface 526 may be configured to manage user input and computing device output. Communications interface 526 may also be configured to managing communications with remote devices (e.g., establishing connection, receiving/transmitting communications, etc.) over one or more communication protocols and/or over one or more communication media (e.g., wired, wireless, etc.).

Computing device 500 is not limited to the components as shown if FIG. 5. Computing device 500 may include other components not shown and/or components shown may be omitted.

The following examples illustrate various aspects of the present disclosure. As used below, any reference to a series of examples is to be understood as a reference to each of those examples disjunctively (e.g., "Examples 1-4" is to be understood as "Examples 1, 2, 3, or 4").

Example 1 is a method comprising: receiving, over a first communication channel, a registration request associated with a unit of a structure; configuring a gateway or provider switching device of the structure to connect a service network to a local area network within the unit; receiving a request to establish a network connection between the gateway and an Internet Service Provider, the request including an identification of a particular Internet Service Provider from a plurality of Internet Service Providers; and facilitating a connection between the gateway or provider switching device and the particular Internet Service Provider.

Example 2 is the method of any of example(s) 1 and 3-13, wherein facilitating the connection between the gateway or provider switching device and the particular Internet Service Provider includes configuring the gateway or provider switching device using virtual local area network tags or virtual extensible local area network tags that match the particular Internet Service Provider.

Example 3 is the method of any of example(s) 1-2 and 4-13, wherein facilitating the connection between the gateway or provider switching device and the particular Internet Service Provider includes establishing a layer 2 virtual private network configured to establish a layer 2 connection between the particular Internet Service Provider and the gateway via the provider switching device.

Example 4 is the method of any of example(s) 1-3 and 5-13, wherein facilitating the connection between the gateway or provider switching device and the particular Internet Service Provider includes enabling a physical interface between the gateway and the Internet Service Provider via the provider switching device.

Example 5 is the method of any of example(s) 1-4 and 6-13, wherein facilitating the connection between the gateway or provider switching device and the particular Internet Service Provider includes establishing a multiprotocol label switch configured to route data packets between the particular Internet Service Provider and the gateway via the provider switching device.

Example 6 is the method of any of example(s) 1-5 and 7-13, further comprising: facilitating distribution of an Internet Protocol address to the end-user computing device via dynamic host configuration protocol.

Example 7 is the method of any of example(s) 1-6 and 8-13, further comprising: facilitating an authentication of a resident gateway positioned between the end-user computing device and the gateway.

Example 8 is the method of any of example(s) 1-7 and 9-13, wherein facilitating an authentication of a resident gateway includes the use of Point-to-Point Protocol over Ethernet or Remote Authentication Dial-In User Service.

Example 9 is the method of any of example(s) 1-8 and 10-13, wherein the request to establish the network connection is received over a portal accessible to devices connected to the local area network.

Example 10 is the method of any of example(s) 1-9 and 11-13, wherein the computing device is configured to facilitate the connection of two or more Internet Service Providers to the local area network.

Example 11 is the method of any of example(s) 1-10 and 12-13, wherein the connection between the gateway and the particular Internet Service Provider is further facilitated over a data link layer.

Example 12 is the method of any of example(s) 1-11 and 13, wherein the second communication channel is between the gateway and the computing device.

Example 13 is the method of any of example(s) 1-12 and 14, wherein the first communication channel is the same as the second communication channel.

Example 14 is the method of any of example(s) 1-13, further comprising: transmitting a communication to particular Internet Service Provider over a third communication channel, wherein the communication includes one or more identifiers associated with the gateway enabling the particular Internet Service Provider to detect the gateway.

Example 15 is a system comprising: one or more processors; a non-transitory computer-readable medium storing instructions that when executed by the one or more processors, cause the one or more processors to perform the methods of any of example(s)s 1-14.

Example 16 is a non-transitory computer-readable medium storing instructions that when executed by one or more processors, cause the one or more processors to perform the methods of any of example(s)s 1-14.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored in a form that excludes carrier waves and/or electronic signals. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Some portions of this description describe examples in terms of algorithms and symbolic representations of operations on information. These operations, while described functionally, computationally, or logically, may be implemented by computer programs or equivalent electrical circuits, microcode, or the like. Furthermore, arrangements of operations may be referred to as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module can be implemented with a computer-readable medium storing computer program code, which can be executed by a processor for performing any or all of the steps, operations, or processes described.

Some examples may relate to an apparatus or system for performing any or all of the steps, operations, or processes described. The apparatus or system may be specially constructed for the required purposes, and/or it may comprise a general-purpose computing device selectively activated or reconfigured by a computer program stored in memory of computing device. The memory may be or include a non-transitory, tangible computer readable storage medium, or any type of media suitable for storing electronic instructions, which may be coupled to a bus. Furthermore, any computing systems referred to in the specification may include a single processor or multiple processors.

While the present subject matter has been described in detail with respect to specific examples, it will be appreciated that those skilled in the art, upon attaining an understanding of the foregoing, may readily produce alterations to, variations of, and equivalents to such embodiments. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

For clarity of explanation, in some instances the present disclosure may be presented as including individual functional blocks including functional blocks comprising devices, device components, steps or routines in a method embodied in software, or combinations of hardware and software. Additional functional blocks may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual examples may be described herein as a process or method which may be depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not shown. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

Devices implementing the methods and systems described herein can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. The program code may be executed by a processor, which may include one or more processors, such as, but not limited to, one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A processor may be a microprocessor; conventional processor, controller, microcontroller, state machine, or the like. A processor may also be implemented as a combination of computing components (e.g., a combination of a DSP and a microprocessor, a plurality of microprocessors, one or more microprocessors in conjunction with a DSP core, or any other such configuration). Accordingly, the term "processor," as used herein may refer to any of the foregoing structure, any combination of the foregoing structure, or any other structure or apparatus suitable for implementation of the techniques described herein. Functionality described herein also can be embodied in peripherals or add-in cards. Such functionality can also be implemented on a circuit board among different chips or different processes executing in a single device, by way of further example.

In the foregoing description, aspects of the disclosure are described with reference to specific examples thereof, but those skilled in the art will recognize that the disclosure is not limited thereto. Thus, while illustrative examples of the disclosure have been described in detail herein, it is to be understood that the inventive concepts may be otherwise variously embodied and employed, and that the appended claims are intended to be construed to include such variations. Various features and aspects of the above-described disclosure may be used individually or in any combination. Further, examples can be utilized in any number of environments and applications beyond those described herein without departing from the broader spirit and scope of the disclosure. The disclosure and figures are, accordingly, to be regarded as illustrative rather than restrictive.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or media devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A method comprising:
receiving, over a first communication channel, a registration request associated with a unit of a structure;
configuring a gateway or provider switching device of the structure to connect a service network to a local area network within the unit;
receiving a request to establish a network connection between the gateway and an Internet Service Provider, the request including an identification of a particular Internet Service Provider from a plurality of Internet Service Providers;
transmitting a communication to the particular Internet Service Provider over a second communication channel, wherein the communication includes one or more identifiers associated with the gateway enabling the particular Internet Service Provider to detect the gateway; and
facilitating a connection between the gateway or provider switching device and the particular Internet Service Provider.

2. The method of claim 1, wherein facilitating the connection between the gateway or provider switching device and the particular Internet Service Provider includes configuring the gateway or provider switching device using virtual local area network tags or virtual extensible local area network tags that match the particular Internet Service Provider.

3. The method of claim 1, wherein facilitating the connection between the gateway or provider switching device and the particular Internet Service Provider includes establishing a layer 2 virtual private network configured to establish a layer 2 connection between the particular Internet Service Provider and the gateway via the provider switching device.

4. The method of claim 1, wherein facilitating the connection between the gateway or provider switching device and the particular Internet Service Provider includes enabling a physical interface between the gateway and the Internet Service Provider via the provider switching device.

5. The method of claim 1, wherein facilitating the connection between the gateway or provider switching device and the particular Internet Service Provider includes establishing a multiprotocol label switch configured to route data packets between the particular Internet Service Provider and the gateway via the provider switching device.

6. The method of claim 1, wherein the request to establish the network connection is received over a cloud service portal.

7. A system comprising:
one or more processors; and a non-transitory computer-readable medium storing instructions that when executed by the one or more processors, cause the one or more processors to perform operations including:

receiving, over a first communication channel, a registration request associated with a unit of a structure;

configuring a gateway or provider switching device of the structure to connect a service network to a local area network within the unit;

receiving a request to establish a network connection between the gateway and an Internet Service Provider, the request including an identification of a particular Internet Service Provider from a plurality of Internet Service Providers;

transmitting a communication to the particular Internet Service Provider over a second communication channel, wherein the communication includes one or more identifiers associated with the gateway enabling the particular Internet Service Provider to detect the gateway; and facilitating a connection between the gateway or provider switching device and the particular Internet Service Provider.

8. The system of claim 7, wherein facilitating the connection between the gateway or provider switching device and the particular Internet Service Provider includes configuring the gateway or provider switching device using virtual local area network tags or virtual extensible local area network tags that match the particular Internet Service Provider.

9. The system of claim 7, wherein facilitating the connection between the gateway or provider switching device and the particular Internet Service Provider includes establishing a layer 2 virtual private network configured to establish a layer 2 connection between the particular Internet Service Provider and the gateway via the provider switching device.

10. The system of claim 7, wherein facilitating the connection between the gateway or provider switching device and the particular Internet Service Provider includes enabling a physical interface between the gateway and the Internet Service Provider via the provider switching device.

11. The system of claim 7, wherein facilitating the connection between the gateway or provider switching device and the particular Internet Service Provider includes establishing a multiprotocol label switch configured to route data packets between the particular Internet Service Provider and the gateway via the provider switching device.

12. The system of claim 7, wherein the request to establish the network connection is received over a cloud service portal.

13. A non-transitory computer-readable medium storing instructions that when executed by one or more processors, cause the one or more processors to perform operations including:

receiving, over a first communication channel, a registration request associated with a unit of a structure;

configuring a gateway or provider switching device of the structure to connect a service network to a local area network within the unit;

receiving a request to establish a network connection between the gateway and an Internet Service Provider, the request including an identification of a particular Internet Service Provider from a plurality of Internet Service Providers;

transmitting a communication to the particular Internet Service Provider over a second communication channel, wherein the communication includes one or more identifiers associated with the gateway enabling the particular Internet Service Provider to detect the gateway; and facilitating a connection between the gateway or provider switching device and the particular Internet Service Provider.

14. The non-transitory computer-readable medium of claim 13, wherein facilitating the connection between the gateway or provider switching device and the particular Internet Service Provider includes configuring the gateway or provider switching device using virtual local area network tags or virtual extensible local area network tags that match the particular Internet Service Provider.

15. The non-transitory computer-readable medium of claim 13, wherein facilitating the connection between the gateway or provider switching device and the particular Internet Service Provider includes establishing a layer 2 virtual private network configured to establish a layer 2 connection between the particular Internet Service Provider and the gateway via the provider switching device.

16. The non-transitory computer-readable medium of claim 13, wherein facilitating the connection between the gateway or provider switching device and the particular Internet Service Provider includes enabling a physical interface between the gateway and the Internet Service Provider via the provider switching device.

17. The non-transitory computer-readable medium of claim 13, wherein facilitating the connection between the gateway or provider switching device and the particular Internet Service Provider includes establishing a multiprotocol label switch configured to route data packets between the particular Internet Service Provider and the gateway via the provider switching device.

* * * * *